United States Patent [19]

Miller

[11] 4,023,155

[45] May 10, 1977

[54] ULTRASONIC TAPE INTRUSION DETECTION SYSTEM

[75] Inventor: G. Kirby Miller, Saratoga, Calif.

[73] Assignee: GTE Sylvania Incorporated, Mountain View, Calif.

[22] Filed: Dec. 23, 1975

[21] Appl. No.: 643,660

[52] U.S. Cl. ........................ 340/258 A; 307/88 ET; 343/5 PD

[51] Int. Cl.[2] .................... G08B 13/16; G01S 9/66; H04R 19/00

[58] Field of Search ......... 340/258 A, 258 C, 38 S; 343/5 PD, 7.7, 8, 180; 307/88 ET; 178/DIG. 10

[56] References Cited

UNITED STATES PATENTS

| | | | |
|---|---|---|---|
| 3,588,382 | 6/1971 | Reedyk | 179/111 E |
| 3,733,581 | 5/1973 | Kalmus | 340/1 R |
| 3,750,125 | 7/1973 | Ross et al. | 340/258 C |
| 3,763,482 | 10/1973 | Burney et al. | 340/258 R |
| 3,851,183 | 11/1974 | Lewiner et al. | 307/88 ET |
| 3,868,624 | 2/1975 | Whitehouse et al. | 340/8 R |
| 3,943,614 | 3/1976 | Yoshikawa et al. | 29/25.35 |

*Primary Examiner*—John W. Caldwell

*Assistant Examiner*—Joseph E. Nowicki

*Attorney, Agent, or Firm*—John F. Lawler; Theodore C. Jay, Jr.; Norman J. O'Malley

[57] ABSTRACT

An active ultrasonic perimeter intrusion detection system comprises an elongated flexible electret tape capable of being stored on and deployed from a reel or the like and connectable when deployed to a signal generator operating at ultrasonic frequencies and to a receiver having a signal processing and alarm capability. The tape comprises an electret layer sandwiched between relatively fixed and movable conductive strips and lies flat on a surface adjacent to the area to be protected such as the walls or ceiling of a room or the perimeter of a ground area. The movable stip produces a substantially undirectional ultrasonic beam outwardly from the tape and along its length so as to illuminate objects that cross over the tape. This causes a reflection of the ultrasonic signal and doppler shifting of its frequency which is detected by the tape, the output of which passes to the receiver for indicating the intrusion. One tape preferably functions as the transmitting and receiving transducer, although separate juxtaposed tapes may also be used for these purposes.

6 Claims, 8 Drawing Figures

ULTRASONIC TAPE INTRUSION DETECTION SYSTEM

BACKGROUND OF THE INVENTION

This invention relates to intrusion detection systems and more particularly to an intrusion detection system for perimeter-type protection.

Fixed security systems such as the fence protection system described in U.S. Pat. No. 3,763,482 have proven highly satisfactory for fixed or permanent facilities such as buildings, depots, prison areas, power distribution substations and towers and the like. There are numerous requirements, however, for a temporary portable perimeter protection system having a rapidly deployable sensor which may be as quickly removed and stored for use again at other locations. An example of such requirement is the protection of building materials at construction sites. In such instances, installation of an appropriate fence or the like is time consuming, costly and wasteful. Other forms of perimeter protection such as closed circuit television require constant visual monitoring by an operator and are susceptible to damage and/or misalignment in handling.

In addition to the above, there is also need for a perimeter protection system with a sensor that may readily be installed along many differently shaped boundaries as well as at sites having irregular surfaces and a plurality of corners. Such sites, for example, may be in hilly or mountainous terrain or may constitute oddly shaped rooms or passageways in buildings or the like. Effective economical protection for such areas has not been provided by prior intrusion detection systems.

OBJECTS AND SUMMARY OF THE INVENTION

A general object of this invention is the provision of a perimeter security system having a flexible line-type sensor that may be compactly rolled onto a reel for storage and quickly unrolled therefrom into operating position.

A further object is the provision of a security system with a sensor having mechanical flexibility that permits installation along irregular surfaces and around corners.

Still another object is the provision of a low cost active ultrasonic perimeter intrusion detection system.

A further object is the provision of such a system with a sensor that may readily be mounted on and removed from the walls or ceiling of a room.

These and other objects of the invention are achieved with an elongated flexible electret tape transducer which transmits and receives ultrasonic waves along the boundary of the protected area and is connected to a processing circuit which gives an alarm when it detects a doppler frequency shift in received waves reflected by an intruder moving over the tape. The transducer may be a single electret tape or two such tapes for transmitting and receiving, respectively.

DESCRIPTION OF PREFERRED EMBODIMENTS

Figure 1:
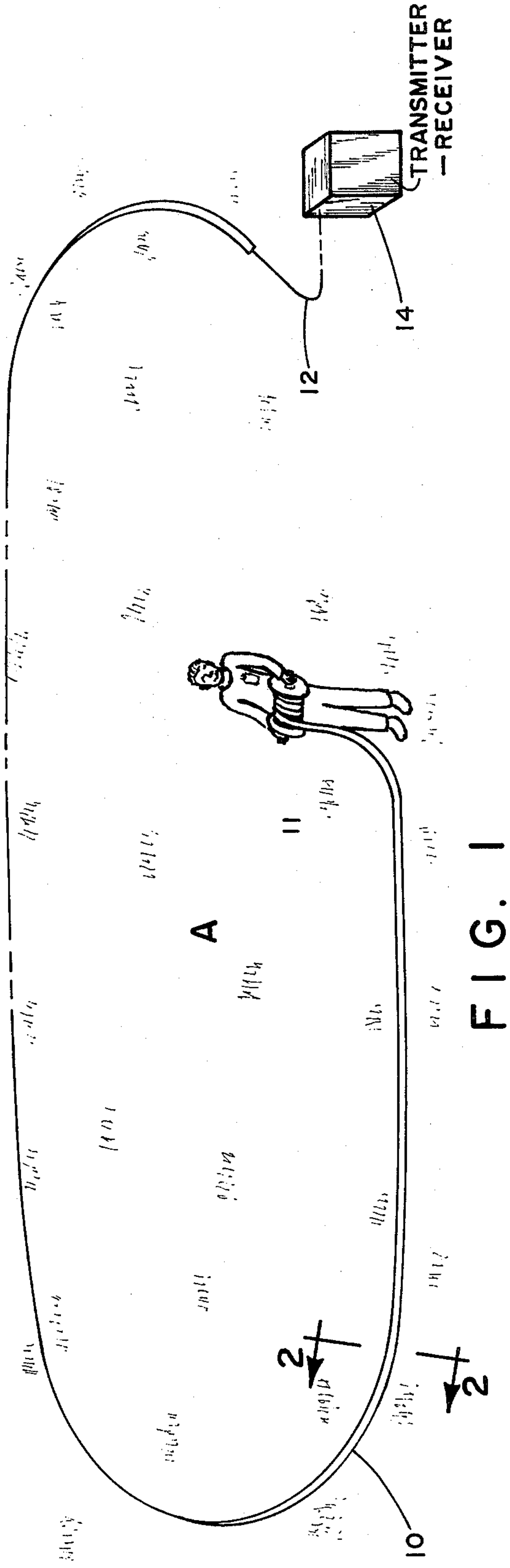
FIG. 1 is a perspective view showing an intrusion detection system embodying this invention being installed around a protected area.

Referring now to the drawings, an intrusion detection system embodying the invention is shown in FIG. 1 and comprises an elongated flexible tape transducer 10 capable of being stored on a reel 11 for rapid deployment by an installer, as shown, around an area A to be protected. The tape is electrically connected at one end to transmitting and receiving apparatus 14 described in greater detail below. The tape is continuous and flat as well as flexible and readily conforms to the shape of the ground G or other supporting surface on which it is laid. It may be partially or completely unrolled from storage reel 11 for use in providing perimeter protection for the bounded area.

Figure 2:
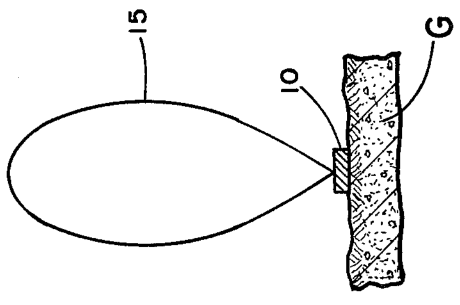
FIG. 2 is an enlarged transverse section taken on line 2—2 of FIG. 1 illustrating the ultrasonic wave radiation pattern of the transducer.

Tape 10 is energized to radiate ultrasonic wave energy throughout its length upwardly from the ground G on which it lies in a directional pattern illustrated by the envelope 25 in FIG. 2. An intruder moving into this radiation zone reflects waves back to the transducer which functions as a receiving sensor and causes apparatus 14 to indicate the attempted intrusion as explained below.

Figure 3:
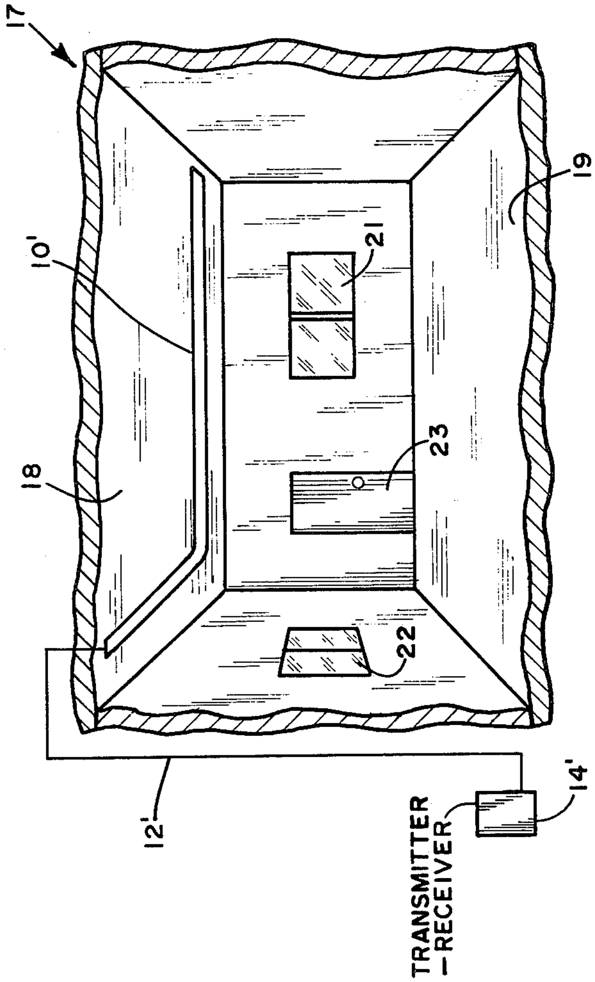
FIG. 3 is a perspective view of the interior of a room in which a security system embodying the invention is installed.

This system is also useful for protecting rooms and the like against intruders. Such an application is illustrated in FIG. 3 as a room 17 with a ceiling 18 and floor 19 and windows 21 and 22 and door 23. Access to the room through the windows or door is monitored by tape transducer 10′ mounted on ceiling 18 and extending parallel and adjacent to the side walls in which the windows and door are located. The primary radiation of transducer 10′ extends from the ceiling to the floor so as to detect a person moving through the radiation zone. The tape is connected by line 12′ to transmitter and receiver apparatus 14′ located at an appropriate station.

Figure 4:
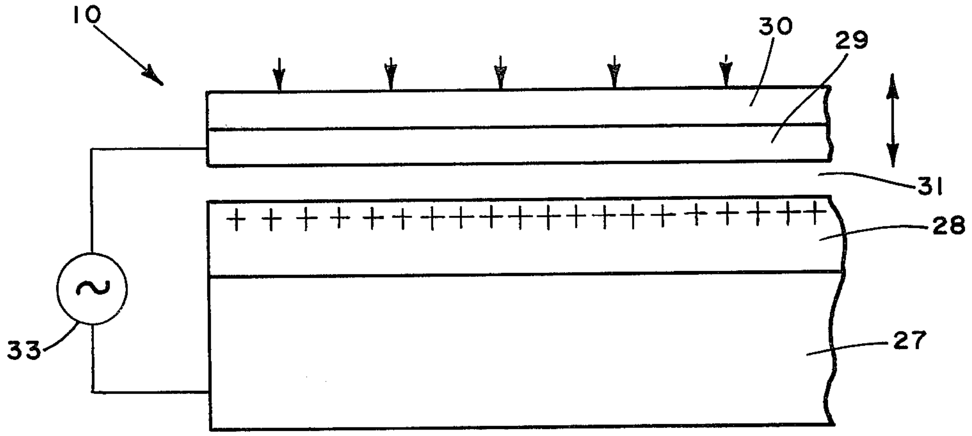
FIG. 4 is a schematic diagram of the tape transducer illustrating the principle of operation.

The principle of operation of the tape transducer 10 will be better understood by reference to FIG. 4. Basically, transducer 10 comprises an inner conductor 27, an electret 28, such as polytetrafluoroethylene (Teflon) bonded tightly to the inner conductor, an outer conductor 29 mounted on and spaced slightly from electret 28, and a plastic jacket or cover 30 tightly secured to outer conductor 29. The space between outer conductor 29 and electret 28 comprises a compliant layer 31, such as air or the like so that outer conductor 29 and jacket 30 are free to move outwardly and inwardly relative to the electret as indicated by the double-headed arrow. The electret has positive charges on its outer surface as indicated on the drawing. An ultrasonic AC generator 33 connected across the inner and outer conductors causes outer conductor 29 and jacket 30 to oscillate relative to the electret layer at the frequency of the generator output and to radiate ultrasonic waves outwardly and generally normal to the plane of the tape. Conversely, ultrasonic wave energy applied to the outer jacket in the direction of the arrows modulates the spacing between outer conductor 29 and electret layer 28 and produces a corresponding AC signal between the outer conductor 29 and inner conductor 27.

The foregoing principle of operation of the electret tape transducer is well known and has been used, for example, in electret microphones and earphones.

Figure 5:
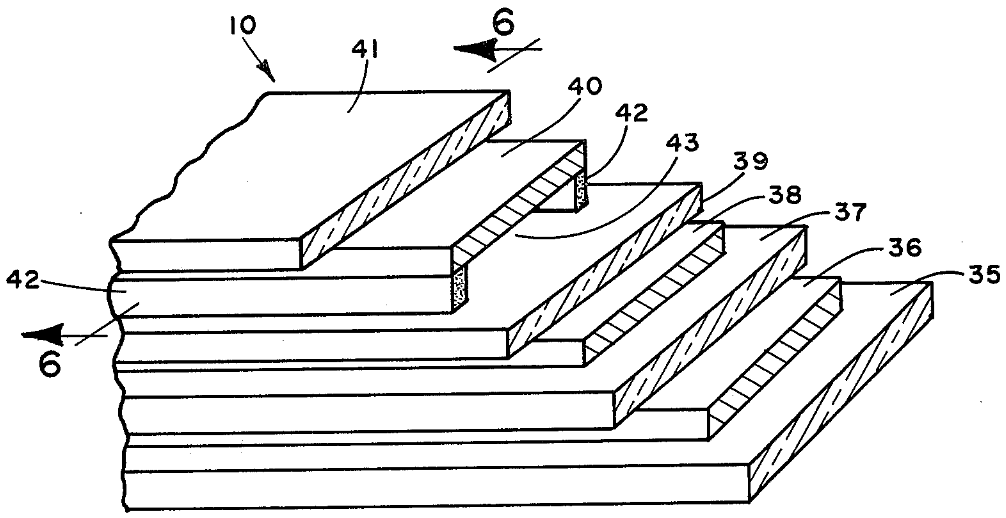
FIG. 5 is a greatly enlarged fragmentary perspective cutaway view of a tape transducer embodying the invention.
Figure 6:
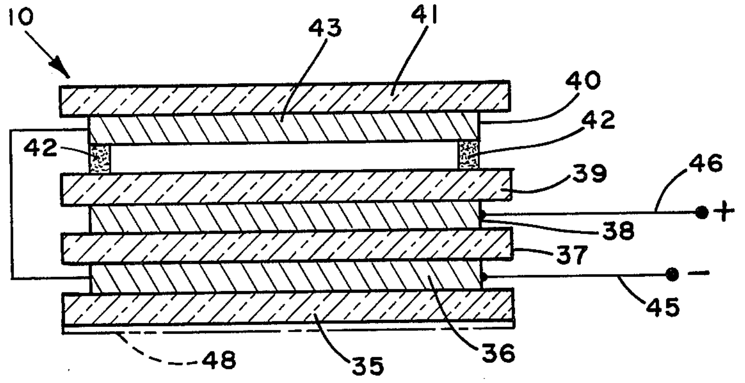
FIG. 6 is a transverse section taken on line 6—6 of FIG. 5.

One form of construction of electret tape 10 is shown in FIGS. 5 and 6, the thicknesses of the various layers being greatly exaggerated for clarity of description and explanation. The assembly consists of a stacked arrangement of an insulator base 35, conductive shielding strip 36, dielectric layer 37, inner strip conductor 38, electret layer 39, outer strip conductor 40 and jacket 41. Outer conductor 40 is spaced from and secured to electret 39 by an adhesive 42 at the marginal edges of these layers so that a small preferably uniformly thick air space 43 exists between the greater portions of the adjacent surfaces of the electret and outer conductor.

Outer conductor 40 is electrically connected to conductor 36 and to lead 45 which is one terminal of the tape transducer and inner conductor 38 is connected to lead 46 which constitutes the other terminal of the transducer.

The various layers which comprise the tape transducer are relatively thin and flexible so as to permit the transducer to be stored on a reel as shown in FIG. 1, to conform to irregular supporting surfaces and to be bent around corners. In one embodiment, jacket 41 and outer conductor 40 comprise aluminized Mylar (an aluminum film on a Mylar strip) having a thickness of 25 $\mu$m, electret layer 39 is a 125 $\mu$m thick FEP Teflon film with the balance of the layers of the assembly being approximately 2 mm thick.

The purpose of conductor 37 is to provide an electromagnetic shield for inner conductor 38 and may be omitted, if desired, if shielding is not necessary. An adhesive material may be applied to the outer surface of base 35 as indicated at 48 in order to permit the tape transducer to be readily mounted on smooth supporting surfaces such as the walls and ceiling of a room.

Figure 7:
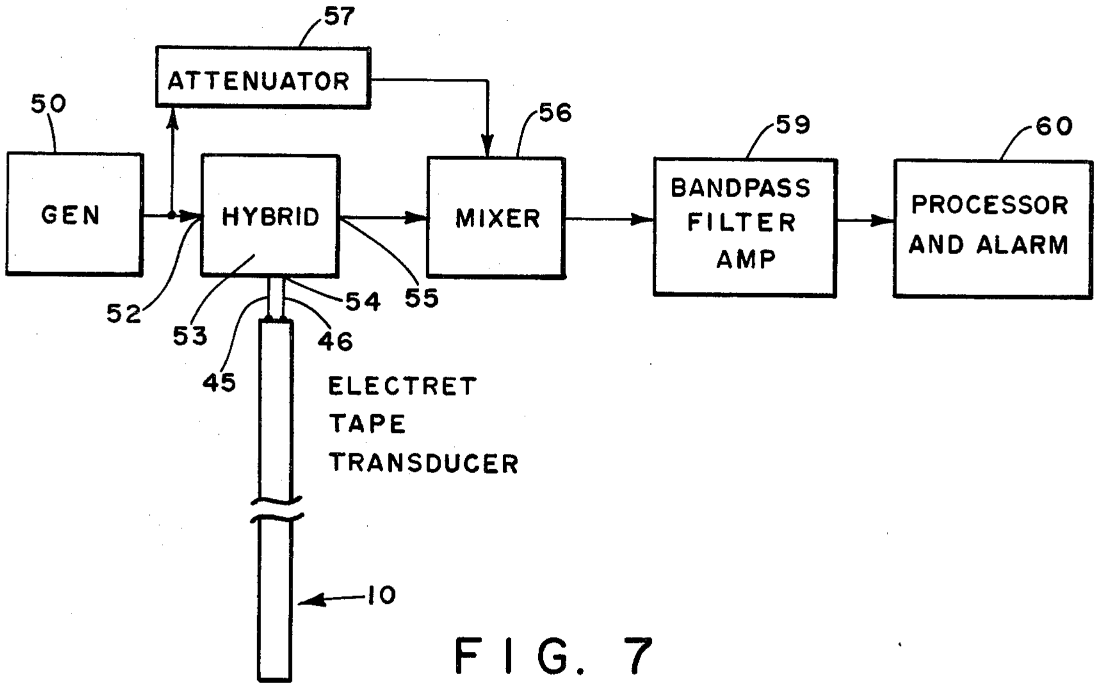
FIG. 7 is a simplified schematic block diagram showing the circuits used in practicing the invention.

The transmitter and receiver apparatus 14 to which the electret tape transducer is connected by line 12 comprises an AC generator 50, see FIG. 7, which has an output frequency in the ultrasonic range, such as 30 KHz. The output of generator 50 is connected to a first port 52 of a hybrid circuit 53, a second port 54 of which is connected to terminals 45 and 46 of the tape transducer. A third port 55 of circuit 53 is connected as one input to a mixer 56 which receives as its second input part of the output of generator 50 through an attenuator 57. Mixer 56 compares frequencies of the generator output and of the reflected signal from the transducer and produces an output when there is a difference as happens with the doppler shifted frequency caused by an intruder. The output of mixer 56 is applied to bandpass filter amplifier 59 which is connected to processor and alarm circuits 60.

Hybrid circuit 53, by way of example, may be the operational amplifier circulator described in the article entitled "An Operational Amplifier Circulator Based on the Weighted Summer" by F. S. Atiya, IEEE Transactions on Circuits & Systems, Vol. CAS-22, No. 6, June 1975 (pages 516–523).

In operation, the output of generator 50 passes from port 52 to port 54 of hybrid circuit 53 to energize the tape transducer and cause its outer conductor 40 and jacket 41 to oscillate at the ultrasonic frequency of the generator and produce ultrasonic wave energy which radiates outwardly from the tape as shown in FIG. 2. If an intruder moves through the radiation envelope of the transducer, ultrasonic waves are reflected from the intruder back to the transducer which produces a corresponding signal between outer conductor 40 and inner conductor 38. This reflection signal has a frequency that is slightly different from the generator frequency as a result of the doppler shift and is applied as an input to the second port 54 of hybrid circuit 53. The output at the third port 55 of that circuit is then applied as one of the two inputs to mixer 56. The mixer compares the input from generator 50 with the reflected signal and produces an output if there is a difference corresponding to the doppler shift. The output of the mixer is filtered by amplifier 59 to produce a signal indicative of an intrusion. This signal is further processed in the alarm circuit 60 to give an appropriate warning of the attempted intrusion.

Figure 8:
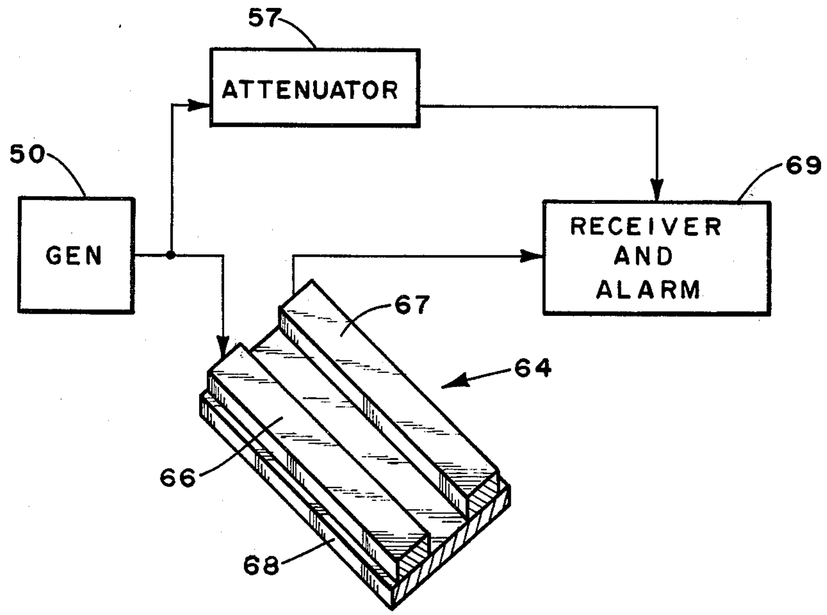
FIG. 8 is a block circuit diagram of a modified form of the invention.

A modified form of the invention is shown in FIG. 8 and comprises a transducer assembly 64 having parallel juxtaposed tape transducers 66 and 67 mounted on a flexible base 68. Each of the tape transducers 66 and 67 is the same as transducer 10 described above. Transducer 66 functions solely as a transmitter and transducer 67 functions solely as a receiver sensor, these transducers being connected separately to generator 50 and receiver and alarm circuits 69, respectively. In other respects the dual tape transducer 64 operates in the same manner as the single tape transducer 10 described above.

From the foregoing description it will be apparent that the ultrasonic tape instrusion detection system is highly portable, quickly deployable, and may be used again and again at sites having differently shaped perimeters and supporting surfaces. The tape transducer is mass producible at a relatively low cost per unit length and the signal generating and receiving circuits are made of low cost compact components. The ultrasonic radiation has desirably limited range and does not provide a source of electromagnetic wave interference even in relatively noisy environments. Furthermore, the absence of electromagnetic signal radiation prevents ready detection of the existence and location of the security system in the field.

What is claimed is:

1. An intrusion detection system for the perimeter of an area to be protected comprising an electric signal generator producing an output at sonic frequencies, receiver means responsive to signals having doppler shifted frequencies for producing an alarm, transducer means comprising at least one elongated flexible electret tape adapted to be disposed around said perimeter, said tape having an electret layer with two sides, a first conductive strip bonded tightly to one of the sides of said electret layer, and a second conductive strip disposed on the other of the sides of said electric layer for limited movement toward and away from the electret layer whereby to produce and to receive sonic wave energy, and means for electrically connecting said transducer means to said generator and to said receiver means whereby sonic waves are produced by said transducer and when reflected by a moving object back to said transducer produce an electrical input to said receiver.

2. The system according to claim 1 in which said transducer means comprises two of said tapes separately electrically connected to said generator and said receiver, respectively.

3. The system according to claim 1 in which said connecting means comprises isolation circuit means which blocks transmission of the generator output from said receiver input.

4. The system according to claim 2 in which said tapes are mounted in parallel juxtaposed positions on a flexible base with said second conductive strip of each tape facing in the same direction.

5. The system according to claim 1 in which said tape is disposed on a supporting surface with said second conductive strip facing away from said surface.

6. An intrusion detection system comprising a source of energy at ultrasonic frequencies, a signal processor having a doppler frequency detection and alarm circuit, an elongated flexible tape transducer having an electret layer and coextensive conductive strips on opposite sides of said electret layer, one of said strips being fixed to one side of said layer, the other of said strips being closely spaced from the other whereby to be movable outwardly and inwardly therefrom, and means for connecting said source and said processor across said strips.

* * * * *